Figure 1:
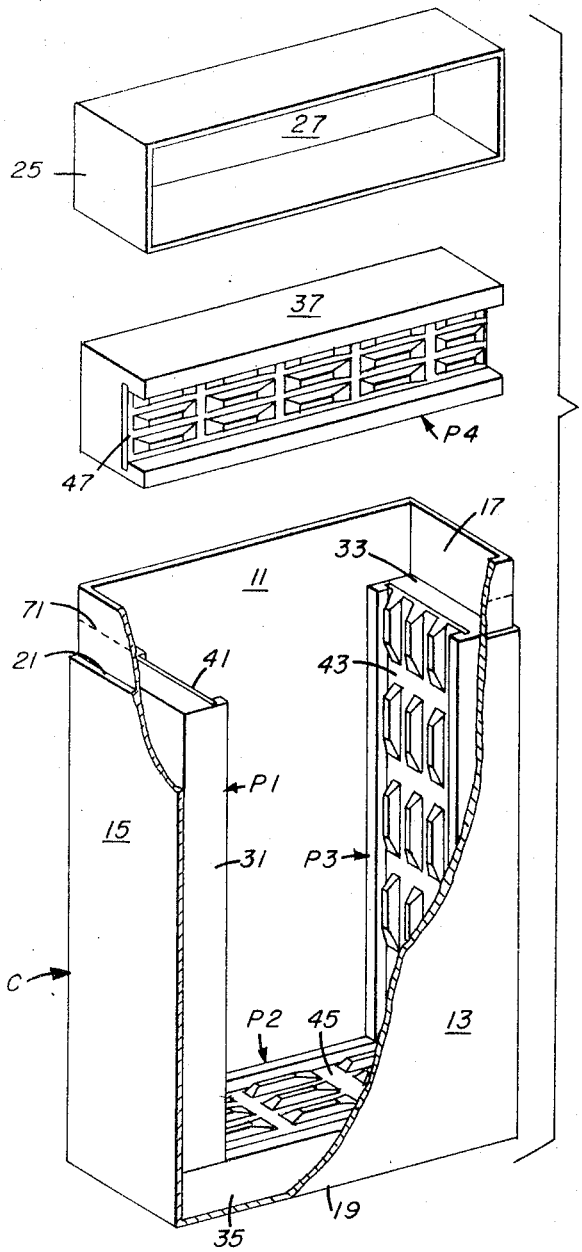
Figure 3:
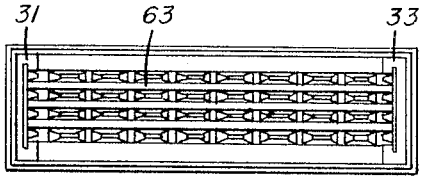
Figure 4:
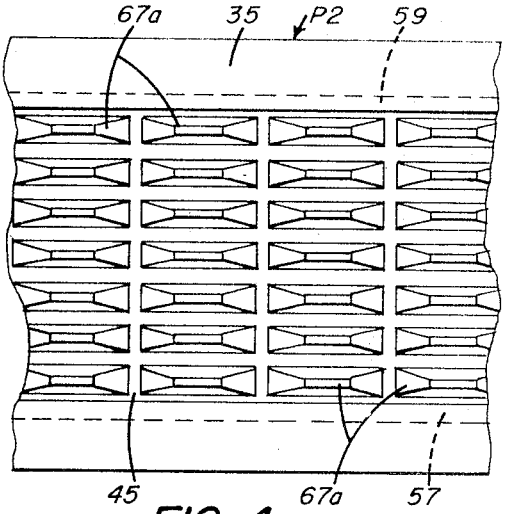
Figure 5:
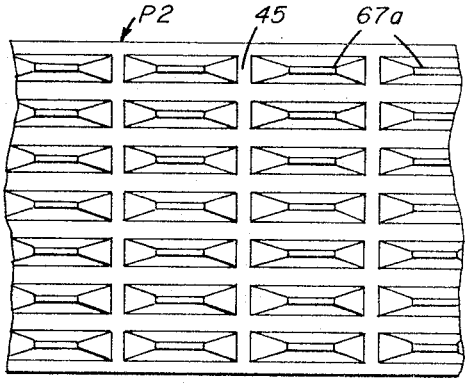
Figure 2:
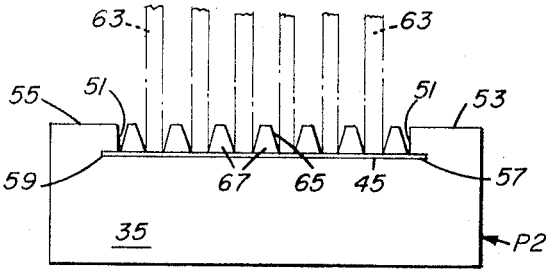

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 9

T927,008

CONTAINER FOR SHIPPING OR STORING FRAGILE PLATES

Larry Sherman, Rochester, and Lawrence C. Dull, Hilton, N.Y. (both of 1669 Lake Ave., Rochester, N.Y. 14650)

Filed Oct. 23, 1973, Ser. No. 408,364

Int. Cl. B65d *85/48*

U.S. Cl. 206—454

1 Sheet Drawing. 10 Pages Specification

A container for one or more plates of fragile material such as glass comprising a cardboard box having two parallel side walls 11, 13, two parallel end walls 15, 17, and a bottom wall 19; a removable and replaceable cover 25 for said box having a wall 27 adapted to form a top wall of said container; a panel comprising a block of semi-rigid foamed polymeric material P1, 2, 3, 4 lining the inside surfaces of each of said end walls, said bottom wall and said top wall; each panel also comprising a sheet 41, 43, 45, 47 of smooth surfaced synthetic resin on the internal surface of each of said blocks, each sheet having at least two parallel lines of ridges protruding therefrom and a valley between adjacent lines of ridges, corresponding ridges associated with said walls being aligned with one another whereby said valleys form coplanar slots to receive a plate and confine all edges thereof. Each ridged sheet lies in a channel of its block and has side edges captured in a pair of kerfs which undercut two rails which bound the channel.

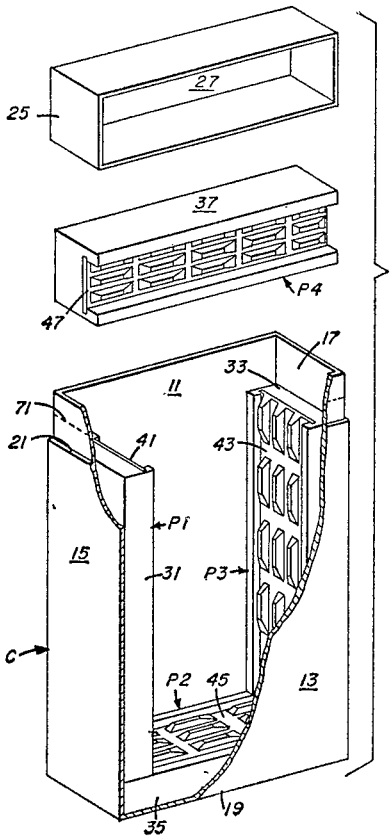

CONTAINER FOR SHIPPING OR STORING FRAGILE PLATES

Filed Oct. 23, 1973